United States Patent
Buvril et al.

(10) Patent No.: US 9,267,588 B2
(45) Date of Patent: Feb. 23, 2016

(54) ROLLER SCREW

(71) Applicants: Gerard Buvril, Bourget du Lac (FR);
Jean-Paul Giraudeau, La Motte Servolex (FR); Philipp Krebs, Nieuwegein (NL); Sebastien Lecluse, Gruffy (FR)

(72) Inventors: Gerard Buvril, Bourget du Lac (FR);
Jean-Paul Giraudeau, La Motte Servolex (FR); Philipp Krebs, Nieuwegein (NL); Sebastien Lecluse, Gruffy (FR)

(73) Assignee: AKTIEBOLAGET SKF, Gothenburg (SE)

( * ) Notice: Subject to any disclaimer, the term of this patent is extended or adjusted under 35 U.S.C. 154(b) by 185 days.

(21) Appl. No.: 13/693,074

(22) Filed: Dec. 4, 2012

(65) Prior Publication Data

US 2013/0152716 A1    Jun. 20, 2013

(30) Foreign Application Priority Data

Dec. 16, 2011   (FR) ..................................... 11 61806

(51) Int. Cl.
*F16H 3/06*      (2006.01)
*F16H 25/22*     (2006.01)

(52) U.S. Cl.
CPC ........ *F16H 25/2266* (2013.01); *F16H 25/2252* (2013.01); *Y10T 74/18576* (2015.01); *Y10T 74/19795* (2015.01)

(58) Field of Classification Search
USPC ......... 74/89.23, 89.15, 424.71, 424.75, 89.44
See application file for complete search history.

(56) References Cited

U.S. PATENT DOCUMENTS

| | | | | |
|---|---|---|---|---|
| 2,683,379 A | * | 7/1954 | Strandgren | 74/424.92 |
| 2,924,112 A | * | 2/1960 | Martens | 74/424.92 |
| 2,974,539 A | * | 3/1961 | Martens | 74/424.92 |
| 3,214,991 A | * | 11/1965 | Perrin | 74/424.92 |
| 3,226,809 A | * | 1/1966 | Perrin | 29/893.31 |
| 3,406,584 A | * | 10/1968 | Roantree | 74/424.92 |
| 3,673,886 A | * | 7/1972 | Tomita et al. | 74/424.75 |
| 4,048,867 A | * | 9/1977 | Saari | 74/424.92 |
| 4,375,770 A | * | 3/1983 | Druet | 74/424.92 |
| 4,576,057 A | * | 3/1986 | Saari | 74/424.92 |
| 4,680,982 A | * | 7/1987 | Wilke et al. | 74/424.75 |
| 4,926,708 A | * | 5/1990 | Dietrich et al. | 74/424.75 |
| 5,749,265 A | * | 5/1998 | Namimatsu et al. | 74/424.75 |
| 5,836,208 A | * | 11/1998 | Dietrich et al. | 74/424.92 |
| 6,170,351 B1 | * | 1/2001 | Zernickel | 74/424.92 |
| 6,199,440 B1 | * | 3/2001 | Greubel et al. | 74/89.23 |
| 6,237,433 B1 | * | 5/2001 | Rodrigues | 74/89.39 |
| 6,282,972 B2 | * | 9/2001 | Kuramochi et al. | 74/459.5 |
| 7,281,604 B2 | * | 10/2007 | Murakami et al. | 180/444 |
| 8,020,463 B2 | * | 9/2011 | Kinoshita et al. | 74/424.92 |
| 8,082,818 B2 | * | 12/2011 | Sugitani | 74/424.91 |
| 8,312,784 B2 | * | 11/2012 | Bonny | 74/424 |

(Continued)

FOREIGN PATENT DOCUMENTS

EP     1347207 A1     9/2003
GB     819978 A     9/1959

*Primary Examiner* — William Kelleher
*Assistant Examiner* — Zakaria Elahmadi
(74) *Attorney, Agent, or Firm* — Bryan Peckjian; SKF USA Inc. Patent Dept.

(57) ABSTRACT

The roller screw mechanism is provided with a screw including an external thread, with a nut arranged about and coaxial with said screw, the nut including an internal thread, and with a plurality of rollers inserted between the screw and the nut and each including an external thread engaging the external and internal threads of said screw and of said nut. The screw is axially moveable in relation to the rollers. The flanks of the thread of the screw have a concave profile in cross section.

17 Claims, 4 Drawing Sheets

(56) References Cited

U.S. PATENT DOCUMENTS

| | | | |
|---|---|---|---|
| 2004/0082431 A1* | 4/2004 | Maydew | 475/331 |
| 2004/0244520 A1* | 12/2004 | Cornelius et al. | 74/424.92 |
| 2005/0160856 A1* | 7/2005 | Sugitani | 74/424.92 |
| 2010/0269616 A1* | 10/2010 | Merlet et al. | 74/424.92 |
| 2011/0193500 A1* | 8/2011 | Seto et al. | 318/14 |
| 2011/0303030 A1 | 12/2011 | Okamoto et al. | |
| 2012/0042741 A1* | 2/2012 | Jacob et al. | 74/89.44 |
| 2012/0240374 A1* | 9/2012 | Kinoshita et al. | 29/407.1 |

* cited by examiner

ROLLER SCREW

CROSS-REFERENCE TO RELATED APPLICATION

This US Non-Provisional Utility application claims the benefit of copending French Patent Application Serial No. FR1161806 filed on Dec. 16, 2011, which is incorporated herein in its entirety.

FIELD OF THE INVENTION

The present invention relates to the field of roller screw mechanisms for transforming a rotary movement into a linear translation movement, and vice versa.

BACKGROUND OF THE INVENTION

One mechanism is provided with a screw including an external thread, with a nut arranged about the screw and including an internal thread, and with a plurality of longitudinal rollers engaging the external and internal threads of the screw and of the nut. In comparison with a ball screw mechanism, the main advantage of a roller screw mechanism is greater admissible load capacities.

A first type of roller screw mechanism includes rollers having an external thread engaging the external and internal threads of the screw and of the nut. The threads of the rollers and the thread of the nut have helix angles that are identical to each other and different to that of the thread of the screw such that, when the screw rotates in relation to the nut, the rollers rotate on themselves and roll about the screw without moving axially inside the nut. The rollers are rotationally guided parallel with the axis of the screw by teeth added on the nut and engaging teeth of said rollers. Such a mechanism is called a planetary roller screw.

A second type of roller screw mechanism has a similar operating principle but is different as a result of an inverted arrangement. The helix angles of the threads of the rollers, of the screw and of the nut are selected such that, when the screw rotates in relation to the nut, the rollers rotate on themselves about the screw and move axially in the nut. The rollers are rotationally guided parallel with the axis of the screw by teeth provided thereon and engaging teeth of said rollers. Such a mechanism is called an inverted planetary roller screw.

With the current design of roller screw mechanisms, the areas of contact of the rollers on the flanks of the thread of the screw and on the flanks of the thread of the nut are relatively reduced. This requires the load capacities of the roller screw mechanisms to be limited such as to prevent the occurrence of stress concentration.

The aim of the present invention is to overcome these disadvantages.

More particularly, the aim of the present invention is to provide a roller screw mechanism wherein, for a given diameter, the load capacity is increased.

SUMMARY OF THE INVENTION

In one embodiment, the roller screw mechanism is provided with a screw including an external thread, with a nut arranged about and coaxial with said screw, the nut including an internal thread, and with a plurality of rollers inserted between the screw and the nut and each including an external thread engaging the external and internal threads of said screw and of said nut. The screw or the nut forms an element which is axially moveable in relation to the rollers. The flanks of the thread of said moveable element have a concave profile in cross section.

Advantageously, each flank of the thread is formed from a circle arc. The axially opposite flanks of the thread can be formed from two circle arcs which are symmetrical in relation to a radial plane or asymmetrical.

In an embodiment, the axial spacing of the centres of the circle arcs is between 10% and 45% of the radius of said circle arcs, and preferably between 13% and 23%, and particularly equal to 18%.

Preferably, the flanks of the thread of the rollers have a convex profile in cross section and are formed from two circle arcs. Advantageously, the radiuses of the circle arcs of the thread of said moveable element are greater than or equal to the radiuses of the circle arcs of the thread of the rollers.

In an embodiment, each roller includes teeth engaging teeth of the nut, the screw being axially moveable in relation to the rollers.

In another embodiment, each roller includes teeth engaging teeth of the screw, the nut being axially moveable in relation to the rollers.

The invention also relates to an actuating jack including a rotating means and a roller screw mechanism as defined above, the screw of the mechanism being coupled with the rotating means.

BRIEF DESCRIPTION OF THE DRAWINGS

The present invention will be better understood upon studying the detailed description of embodiments given by way of example, which are in no way limiting and are illustrated by the appended drawings, wherein.

DETAILED DESCRIPTION OF THE INVENTION

Figure 1:
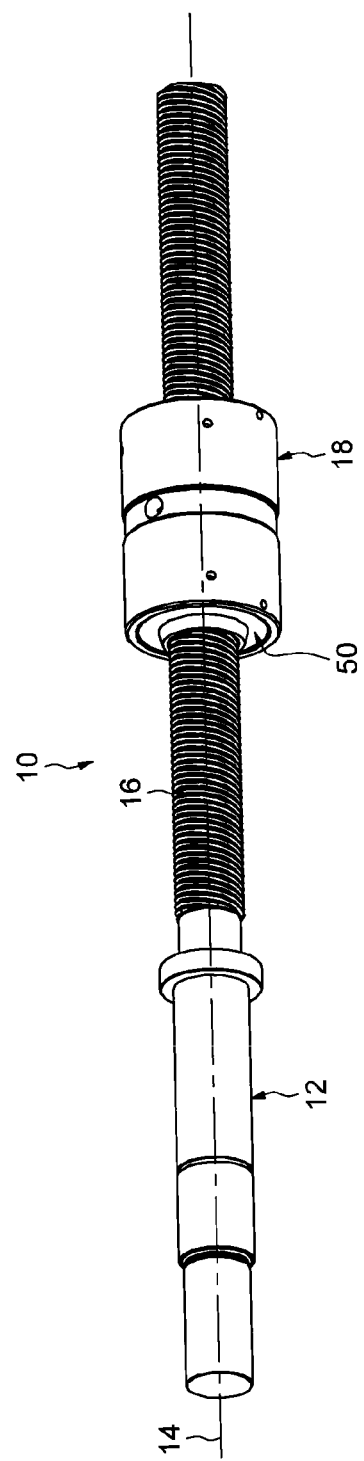
FIG. 1 is a perspective view of a roller screw mechanism according to a first embodiment of the invention.
Figure 2:
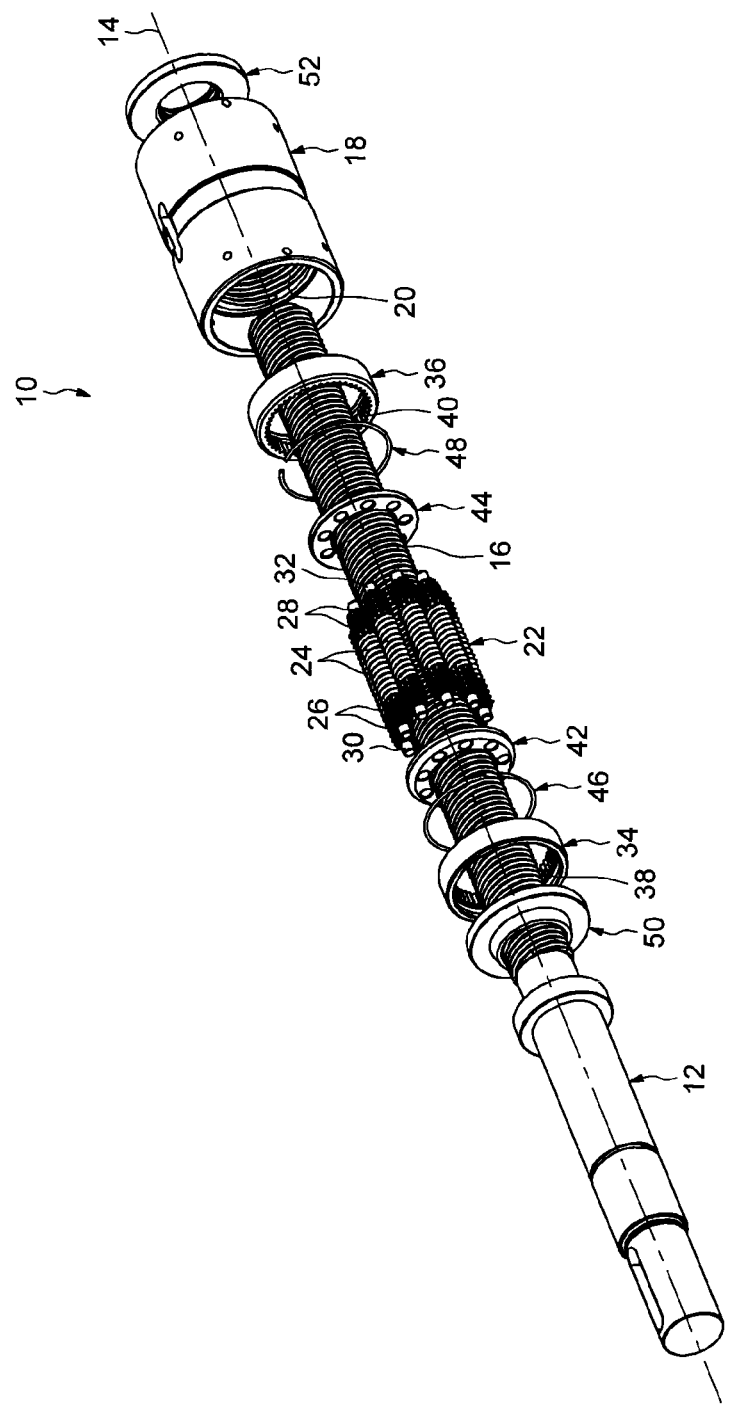
FIG. 2 is an exploded perspective view of the mechanism of FIG. 1.
Figure 3:
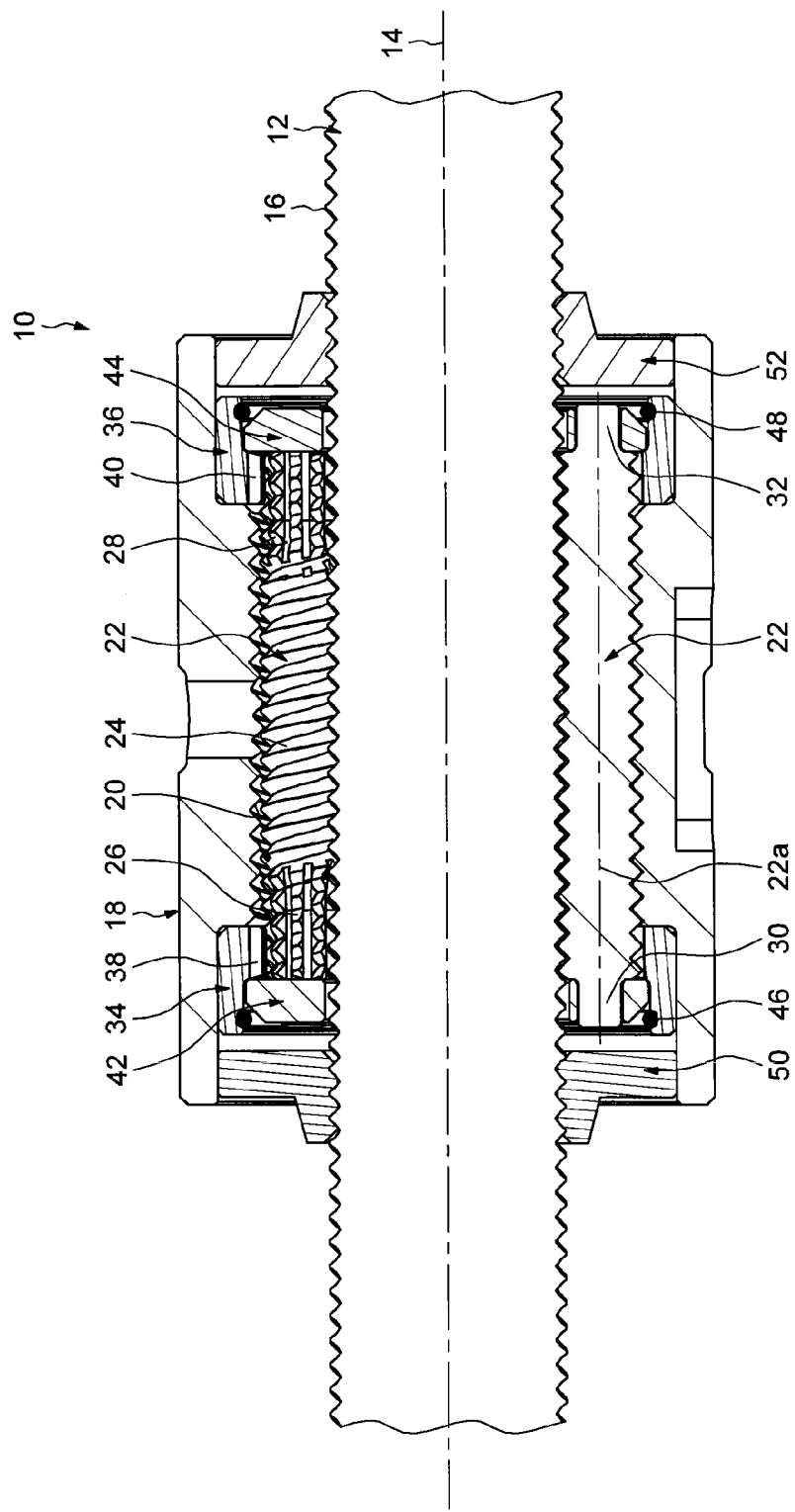
FIG. 3 is a partial cross-sectional view of the mechanism of FIG. 1.

In FIGS. 1-3, a roller screw mechanism, which is referenced 10 as a whole, includes a screw 12, with an axis 14, which screw is provided with an external thread 16, a nut 18 mounted coaxially about the screw 12 and provided with an internal thread 20, the internal diameter of which is greater than the external diameter of the external thread 16, and a plurality of longitudinal rollers 22 arranged radially between the screw and the nut. The screw 12 extends longitudinally through a cylindrical bore of the nut 18 on which the internal thread 20 is formed.

The rollers 22 are identical to each other and are distributed in a regular manner about the screw 12. Each roller 22 extends along an axis 22a which is coaxial with the axis 14 of the screw and includes an external thread 24 engaging the thread 16 of the screw and the thread 20 of the nut. The thread of the screw 12 and the nut 18 each include five thread start lead-ins and the thread of each roller 22 includes one thread start lead-in. The thread 24 of each roller is extended axially at each end by teeth 26, 28 themselves extended axially by a cylindrical stud 30, 32 extending outwards.

The mechanism 10 includes two annular collars 34, 36 fixed in a non-threaded part of the bore of the nut 18 and each including internally teeth 38, 40 engaging the teeth 26, 28 respectively of the rollers for the synchronization thereof. The mechanism 10 also includes two annular hoops 42, 44 each mounted radially between the thread 16 of the screw and the associated collar 34, 36 and including a plurality of cylindrical through-recesses (not referenced) which are distributed in a regular manner in the circumferential direction and inside which the studs 30, 32 of the rollers are housed. The hoops 42, 44 enable the rollers 22 to be carried and the regular circumferential spacing thereof to be kept.

The mechanism 10 further includes retainer rings 46, 48 each mounted in a groove provided in the bore of the associated collar 34, 36 and provided in order to axially hold the corresponding hoop 42, 44, and two end caps 50, 52 fixed in the bore of the nut proximate to said hoops. The caps 50, 52 axially block the bore of the nut and each include a thread engaging the thread 16 of the screw.

The threads 24 of the rollers and the thread 20 of the nut have helix angles that are identical to each other and different to that of the thread 16 of the screw such that, when the screw 12 rotates in relation to the nut 18, the rollers 22 rotate on themselves and roll about the screw 12 without moving axially inside the nut 18. The rollers 22 are rotationally guided parallel with the axis 14 by the teeth 38, 40 of the collars. The screw 12 is axially or longitudinally moveable in relation to the rollers 22.

Figure 4:
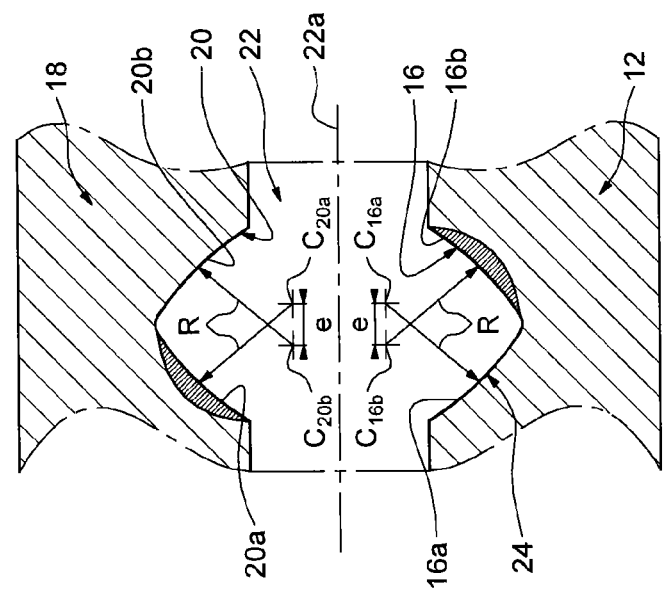
FIG. 4 is a detail view of FIG. 3.

As illustrated in FIG. 4, the flanks of the thread of each roller each have, in cross section, a convex profile formed from a circle arc, the circle arcs defining said flanks being symmetrical in relation to a radial mid-plane which is perpendicular to the axis 22a of the rollers and meeting at said plane.

The flanks 16a, 16b of the thread 16 of the screw each have, in cross section, a concave profile formed from a circle arc, the circle arcs defining said flanks being symmetrical in relation to a radial mid-plane which is perpendicular with the axis 22a of the rollers and meeting at said plane. The centres $C_{16a}$, $C_{16b}$ of the flanks are symmetrical in relation to said radial plane. The centres $C_{16a}$, $C_{16b}$ are radially located between the external surface of the thread 16 and the axis 22a of the rollers. The radius R of each flank 16a, 16b is greater than or equal to the radius (not shown) of the associated convex flank of the roller 22.

Providing concave flanks 16a, 16b for the thread of the screw 12 enables the areas or surfaces of contact of the rollers 22 on each flank 16b, or 16a to be increased, compared with a conventional screw including a thread having, in cross section, a triangular profile defined by two opposite straight flanks. In operation, during the transmission of the forces, the contact pressure exerted by the flanks of each roller 22 on the flanks 16b, or 16a, of the thread of the screw is distributed over a larger surface. In the figure, the contact pressure is modelled schematically using Hertz theory. Thanks to the profile of the thread of the screw 12 which is axially moveable in relation to the rollers 22, the load capacity of the roller screw mechanism is increased and the stress concentration occurrence phenomenon is limited.

The axial spacing e of the centres $C_{16a}$, $C_{16b}$ is between 10% and 45% of the radius R of said arcs, and preferably between 13% and 23%, and advantageously equal to 18%. In the illustrated embodiment, the axial spacing e is equal to 18% of the radius R. With such spacing, the stresses applied by the rollers 22 on the flanks 16a, 16b of the screw are distributed substantially over the whole length of the flank. Therefore, better stress distribution is achieved.

The thread 20 of the nut is radially opposite the thread 16 of the screw. Each flank 20a, 20b of the thread 20 of the nut has, in cross section, a concave profile formed from a circle arc. The circle arcs forming the flanks 20a, 20b are symmetrical in relation to the radial mid-plane perpendicular with the axis 22a of the rollers. In the illustrated embodiment, the thread 20 of the nut is symmetrical in relation to the thread 16 of the screw considering an axial plane containing the axis 22a of the rollers. The centres $C_{20a}$, $C_{20b}$ of the flanks are symmetrical in relation to said radial plane and are radially located between the internal surface of the thread 20 and the axis 22a of the rollers. The radius R of each flank 20a, 20b is greater than or equal to the radius (not represented) of the associated convex flank of the roller 22. The axial spacing e of the centres $C_{20a}$, $C_{20b}$ is equal to that between the centres $C_{16a}$, $C_{16b}$.

Figure 5:
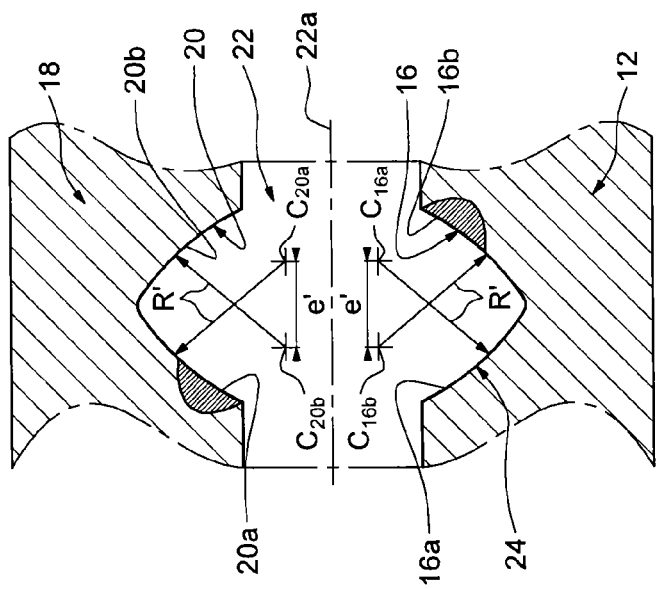
FIG. 5 is a partial cross-sectional view of a roller screw mechanism according to a second embodiment of the invention.

In the alternative embodiment illustrated in FIG. 5 wherein the same elements have the same references, the axial spacing e' of the centres $C_{16a}$, $C_{16b}$ and of the centres $C_{20a}$, $C_{20b}$ is equal to 38% of the radius R' of the circle arcs of the flanks 16a, 16b, said radius having a dimension that is greater than that of the radius R of the previous embodiment. In this alternative, the contact of the rollers 22 on each flank 16b, or 16a, of the thread of the screw is decentred towards the crest of the thread. The stresses applied by the rollers 22 on the flanks 16a, 16b of the screw are not distributed over the entire length of the flank.

In the illustrated embodiments, the flanks 20a, 20b of the thread of the nut each have, in cross section, a concave profile. In an alternative, it could however be possible to provide, for the nut, a thread having, in cross section, a triangular profile defined by two opposite straight flanks connected together by a concave bottom, or a trapezoidal profile. Indeed, the applicant has established that, to increase the load capacity of a roller screw mechanism, only the provision of a concave profile for the element that is moveable in relation to the rollers 22, in this instance the screw, is essential. For the element that is fixed in relation to the rollers 22, in this instance the nut 18, concave flanks or conventional straight flanks can be provided for the thread.

The present invention has been illustrated on the basis of a planetary roller screw mechanism. For an inverted planetary roller screw mechanism wherein the nut is longitudinally moveable in relation to the rollers and wherein the screw includes teeth engaging the teeth of the rollers, the thread of the nut includes concave flanks as described above for the screw in the illustrated embodiments, wherein the flanks of the thread of the screw can be concave or straight.

The invention claimed is:

1. A roller screw mechanism comprising,
   a screw having an external thread,
   a nut arranged about and coaxial with said screw, the nut including an internal thread, and
   a plurality of rollers inserted between the screw and the nut, each including an external thread engaging the external and internal threads of said screw and of said nut, wherein
   the screw or the nut forms an element axially moveable in relation to the rollers, and wherein
   the flanks of the thread of said moveable element have a concave profile in cross section,
   wherein each flank of the thread of the moveable element is formed from a circle arc, wherein the axially opposite flanks of the thread are formed from two circle arcs which are symmetrical in relation to a radial plane, and the wherein the axial spacing of the centers of the circle arcs is between 10% and 45% of the radius of the circle arcs.

2. A roller screw mechanism comprising,
a screw having an external thread,
a nut arranged about and coaxial with said screw, the nut including an internal thread, and
a plurality of rollers inserted between the screw and the nut, each including an external thread engaging the external and internal threads of said screw and of said nut, wherein
the screw or the nut forms an element axially moveable in relation to the rollers, and wherein
the flanks of the thread of said moveable element have a concave profile in cross section, and
wherein each flank of the thread of the moveable element is formed from a circle arc and wherein the axially opposite flanks of the thread are formed from two asymmetric circle arcs.

3. The mechanism according to claim 1, wherein the flanks of the thread of the rollers have a convex profile in cross section and are formed from two circle arcs.

4. The mechanism according to claim 3, wherein the radiuses of the circle arcs of the thread of the moveable element are greater than or equal to the radiuses of the circle arcs of the thread of the rollers.

5. The mechanism according to claim 1, wherein each roller includes teeth that engage teeth of the nut, the screw being axially moveable in relation to the rollers.

6. The mechanism according to claim 1, wherein each roller includes teeth that engage teeth of the screw, the nut being axially moveable in relation to the rollers.

7. A roller screw mechanism comprising,
a screw having an external thread,
a nut arranged about and coaxial with said screw, the nut including an internal thread, and
a plurality of rollers located between the screw and the nut, each roller of the plurality of rollers having a longitudinal axis of rotation and including an external thread engaging the external thread of the screw and the internal thread of the nut,
wherein the screw or the nut forms an element axially moveable in relation to the plurality of rollers, and
wherein the flanks of the thread of the moveable element have a profile of a circle arc in cross section, and
wherein the centers of the circle arcs are radially located between the external surface of the thread of the movable element and the longitudinal axis of rotation of one of the plurality of rollers.

8. The mechanism according to claim 7, wherein the circle arcs of two axially opposite flanks of the thread of the moveable element are symmetrical in relation to a radial plane.

9. The mechanism according to claim 8, wherein an axial spacing of centers of the circle arcs of two axially opposite flanks of the thread of the moveable element is between 10% and 45% of the radius of the circle arcs.

10. The mechanism according to claim 8, wherein an axial spacing of centers of the circle arcs of two axially opposite flanks of the thread of the moveable element is between 13% and 23% of the radius of the circle arcs.

11. The mechanism according to claim 8, wherein an axial spacing of centers of the circle arcs of two axially opposite flanks of the thread of the moveable element is equal to 18% of the radius of the circle arcs.

12. The mechanism according to claim 7, wherein the axially opposite flanks of the thread are formed from two asymmetric circle arcs.

13. The mechanism according to claim 7, wherein the flanks of the thread of the rollers have a convex profile in cross section and are formed from two circle arcs.

14. The mechanism according to claim 7, wherein the radiuses of the circle arcs of the thread of the moveable element are greater than or equal to the radiuses of the circle arcs of the thread of the rollers.

15. The mechanism according to claim 7, wherein each roller includes teeth that engage teeth of the nut, the screw being axially moveable in relation to the rollers.

16. The mechanism according to claim 7, wherein each roller includes teeth that engage teeth of the screw, the nut being axially moveable in relation to the rollers.

17. An actuating jack comprising: the roller screw mechanism of claim 7.

* * * * *